June 24, 1930.  P. HONN  1,767,072
FLUID PRESSURE PUMP
Filed Feb. 25, 1928  2 Sheets-Sheet 1

INVENTOR
PETER HONN.
BY
Cyrus W. Rice
ATTORNEY

INVENTOR
PETER HONN
BY Cyrus W. Rice
ATTORNEY

Patented June 24, 1930

1,767,072

UNITED STATES PATENT OFFICE

PETER HONN, OF GRAND RAPIDS, MICHIGAN

FLUID-PRESSURE PUMP

Application filed February 25, 1928. Serial No. 256,903.

This invention relates to fluid pressure pumps and more particularly water pressure pumps for withdrawing predetermined amounts of liquid from a container and delivering the withdrawn liquid into the water stream to be sprinkled or sprayed.

The main objects of this invention are to provide an improved form of fluid pressure pump; to provide an improved form of water pressure pump designed for use in withdrawing liquids from a container and delivering the same into the water stream for subsequent sprinkling or spraying; to provide an improved form of pump operated by a revolving shaft rotated by water under pressure; to provide an improved cam carried by said shaft for operating said pump; to provide an improved adjusting means for limiting the throw of the piston of the pump; and, to provide a generally improved device having the combined improved features above mentioned.

An illustrative embodiment of the invention is shown in the accompanying drawings wherein:—

Figure 1:
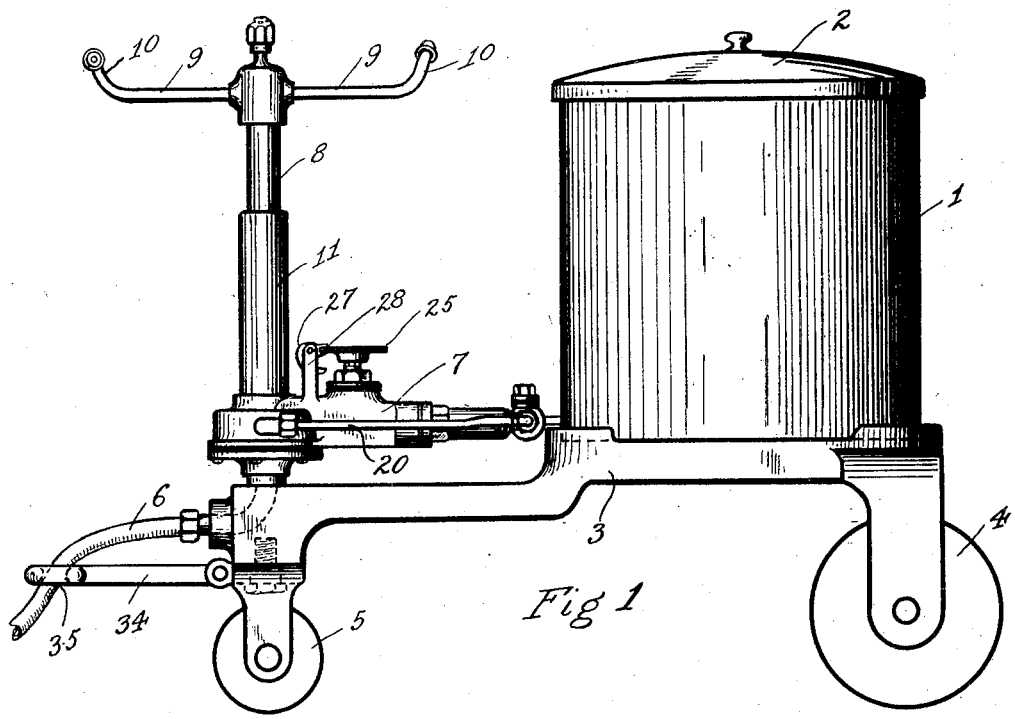
Figure 1 is a side elevation of the device here used as a fertilizer sprinkler.

In the construction shown in the drawings, a liquid fertilizer container is mounted on a carriage. Water pressure from a suitable supply source causes a tubular shaft having a cam mounted thereon, to rotate and during the rotation of the cam, a spring tensioned piston is thereby caused to reciprocate. The fertilizer liquid within the container is thereby withdrawn and delivered into the water stream which is subsequently sprinkled or sprayed.

Referring to the drawings, a cylindrical container 1 for liquid fertilizer is provided with a detachable cover 2 to provide for refilling. The container is mounted on a carriage 3 provided with rear wheels 4 and front wheels 5 which are pivotally mounted to provide ready mobility.

Water under pressure from a suitable source of supply such as a city main is delivered by means of a garden hose 6 to operate the water pressure pump generally designated 7, hereinafter more particularly described.

A vertically disposed tubular shaft 8 communicates with the garden hose and is provided at its upper end with a plurality of laterally disposed pipes 9 of smaller internal diameter. Extremities 10 of these pipes are similarly angularly disposed and water under pressure delivered therefrom causes the tubular shaft 8 to rotate. A housing 11 encloses the central portion of the rotatable shaft 8 and a cam 12 is integrally formed with this shaft and is thereby caused to rotate therewith.

The pump 7 is provided with a horizontally disposed piston 13 whose end 14 is diametrically cross sectionally smaller.

A helical expansion spring 15 encircles a portion of the diametrically smaller part of the piston and abuts against the collar 16 to urge the piston in the direction indicated by the arrow. The end of the piston adjacent the cam 12 is slotted to form a yoke 17 in which a roller 18 is freely rotatably secured as by the pintle 19. The roller 18 bears against the cam 12 and the rotation of the tubular shaft 8 causes the piston to reciprocate.

A pipe, generally designated 20, is connected with the liquid container 1 and is in communication with the water stream delivered to the pressure driven rotating shaft 8. Gravity ball valves 21 and 22 in the pipe line 20 are alternately opened and closed by the pump in the reciprocating movement of its piston and the fertilizing liquid is thereby periodically delivered into the water stream where it is mixed before it is emitted from the pipes 9.

The throw of this piston and the resultant amount of fertilizing liquid delivered to the water stream is adjustably determined by means of a cam 23 mounted on a vertically disposed rotatable shaft 24. Secured to the upper end of this shaft is a wheel 25 provided with radial notches 26 at different points on its periphery. A detent or pawl 27 is pivotally mounted on a bracket 28 by means of a pintle 29 and a tongue 30 of the detent or pawl may be secured within any of the several notches 26 for regulating the throw of the piston which is milled out at 31 to provide sufficient space for the cam 23.

In order to provide against pressure of the water on the inner end of the piston which would deter the efficiency of the helical spring, a plurality of slots or grooves 32 are provided. In this manner, water may pass into the piston housing 33 equalizing the pressure to "float" the piston.

The carriage is provided with a short tongue 34 having a handle 35 embracing the hose 6. The carriage may be thereby moved from place to place by pulling on the hose.

In operation, water under pressure is delivered through the garden hose and allowed to escape through the pipes 9. The pressure of the water causes the shaft 8 to rotate and in its rotation, the water is sprinkled or sprayed and the piston is caused to reciprocate by the rotation of the cam against the freely rotatable wheel carried at the end of the piston.

Figure 2:
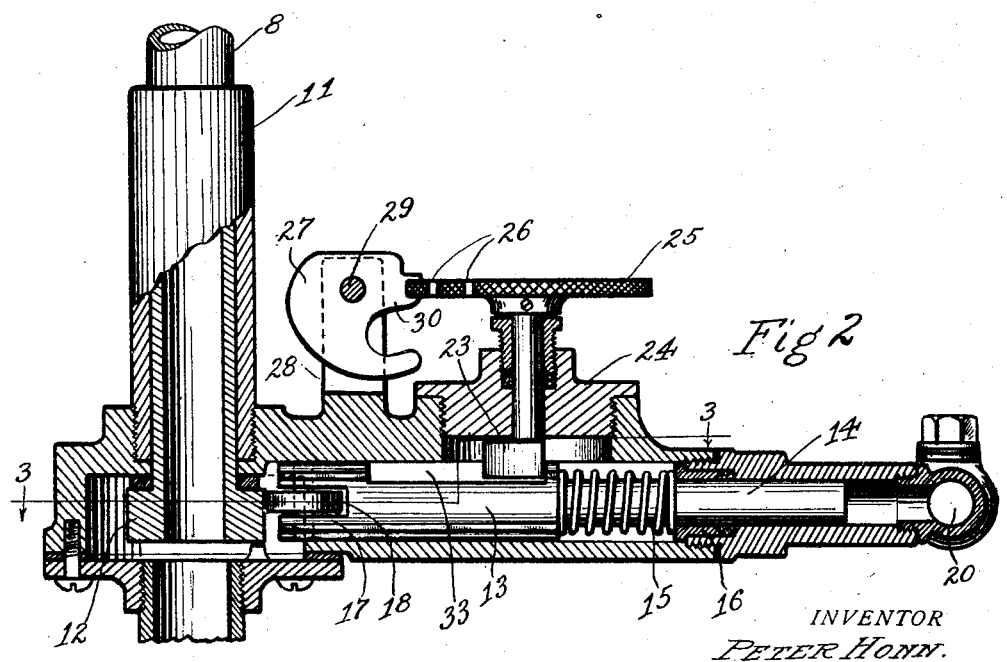
Figure 2 is an enlarged fragmentary longitudinal sectional view of the improved pump and its operating mechanism.
Figure 3:
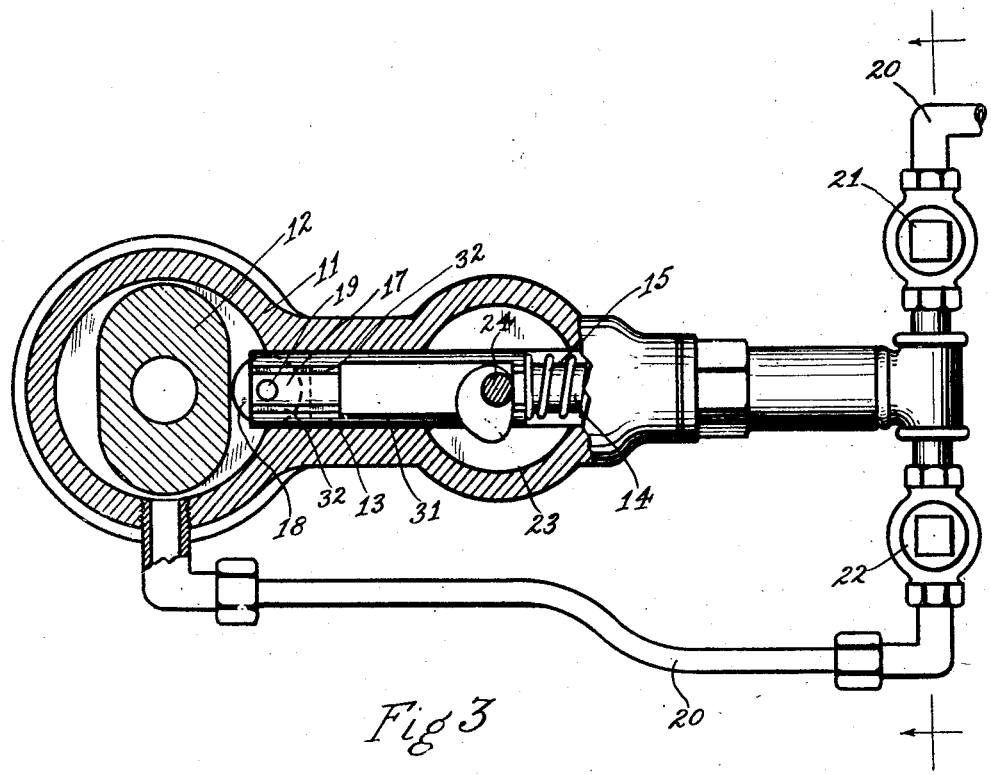
Figure 3 is a sectional view taken on line 3—3 of Figure 2, a portion thereof being broken away to better show the interior construction.
Figure 4:
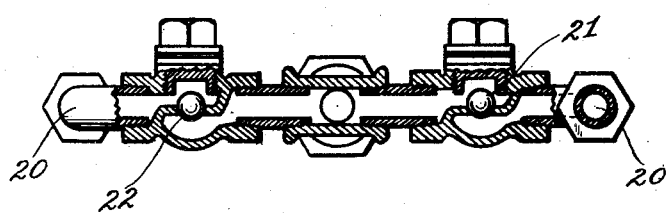
Figure 4 is a sectional view taken on line 4—4 of Figure 3.

In the position of the piston shown in Figures 2 and 3, the valve 21 controlling the flow from the container, is sealed and the valve 22 controlling the flow to the water stream, is open. In the reciprocating movement of the piston, the valves are alternately open and closed and the fertilizing liquid is thereby periodically delivered to the water stream in predetermined amounts depending upon the limit fixed for the throw of the piston.

It will thus be seen that the improved water pressure pump is aptly capable of doing its designated work and while but one specific embodiment of the invention has been herein shown and described, it will be understood that numerous details of construction may be altered or omitted without departing from the spirit of the invention as defined by the following claims.

I claim:

1. In a device of the class described, a tubular shaft for carrying a stream of water and rotatable by the pressure of said stream, a cam carried by said shaft and rotatable therewith, a fluid container having a fluid line communicating with said tubular shaft, and a pump located in the fluid line leading from the container to the tubular shaft and having a spring tensioned piston adapted to be reciprocated by the rotation of said cam for withdrawing fluid from said container and delivering said withdrawn fluid into said water stream.

2. In a device of the class described, a tubular shaft for carrying a stream of water and rotatable by the pressure of said stream, a cam carried by said shaft and rotatable therewith, a fluid container having a fluid line communicating with said shaft, a pump located in the fluid line leading from the container to the tubular shaft and having a spring tensioned piston adapted to be reciprocated by the rotation of said cam for withdrawing fluid from said container and delivering said withdrawn fluid into said water stream and means for adjustably limiting the throw of said piston.

3. In a device of the class described, a tubular shaft for carrying a stream of water, a plurality of laterally disposed pipes secured thereto and in communication therewith whose outer ends are similarly angularly disposed, said shaft adapted to be rotated by a stream of water under pressure, a cam carried by said shaft and rotatable therewith, a fluid container having a fluid line communicating with said shaft, and a pump located in the fluid line leading from the container to the tubular shaft and having a spring tensioned piston adapted to be reciprocated by the rotation of said cam for withdrawing fluid from said container and delivering said withdrawn fluid into said water stream.

4. In a device of the class described, a tubular shaft for carrying a stream of water and rotatable by the pressure of said stream, a cam carried by said shaft and rotatable therewith, a fluid container having a fluid line communicating with said shaft, dual valves in said fluid line, and a pump cooperatively associated with said dual valves and having a spring tensioned piston adapted to be reciprocated by the rotation of said cam for alternately opening and closing said valves, to withdraw fluid from said container and to deliver said withdrawn fluid into said water stream periodically.

5. In a device of the class described, a tubular shaft adapted to be rotated by a stream of water passing therethrough, a fluid line venting into said stream, and means operated by the rotation of the shaft for controlling the flow of fluid through said line into the water stream.

6. In a device of the class described, a tubular shaft adapted to be rotated by a stream of water passing therethrough, a fluid line venting into said stream, and adjustable means operated by the rotation of the shaft for controlling the flow of fluid through said line into the water stream.

7. In a device of the class described, a tubular shaft adapted to be rotated by a stream of water passing therethrough and having a cam, a fluid line venting into said stream, a pump having a piston slidably operated by the cam for propelling fluid through said line into the water stream.

8. In a device of the class described, a rotatable tubular shaft forming a conduit for a stream of water, a fluid line venting into said stream, and means operated by the rotation of the shaft for controlling the flow of fluid through said line into the water stream.

9. In a device of the class described, a tubular shaft adapted to be rotated by a stream of water passing therethrough and having a cam, a fluid line venting into said stream, a pump having a piston extending into the water stream and having a by pass and slidably operated by the cam for propelling fluid through said line into the water stream.

In testimony whereof I have hereunto set my hand at Grand Rapids, Michigan, this 16th day of February, 1928.

PETER HONN.